US010391591B2

(12) United States Patent
Smith

(10) Patent No.: US 10,391,591 B2
(45) Date of Patent: *Aug. 27, 2019

(54) JIG FOR FIREARM LOWER RECEIVER MANUFACTURE

(71) Applicant: 80 Percent Arms Inc., Garden Grove, CA (US)

(72) Inventor: Tilden Alan Smith, Westminster, CA (US)

(73) Assignee: 80 Percent Arms Inc., Garden Grove, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/053,577

(22) Filed: Aug. 2, 2018

(65) Prior Publication Data

US 2019/0039192 A1   Feb. 7, 2019

Related U.S. Application Data

(60) Provisional application No. 62/540,534, filed on Aug. 2, 2017, provisional application No. 62/552,368, filed on Aug. 30, 2017.

(51) Int. Cl.
*F41A 3/66* (2006.01)
*B23P 13/02* (2006.01)
*B23Q 3/00* (2006.01)

(52) U.S. Cl.
CPC .............. *B23P 13/02* (2013.01); *B23Q 3/00* (2013.01); *F41A 3/66* (2013.01)

(58) Field of Classification Search
CPC .................................. B23P 13/00; F41A 3/66

USPC ........................................................ 33/567
See application file for complete search history.

(56) References Cited

U.S. PATENT DOCUMENTS

| 362,044 A | 4/1887 | Strange |
| 1,476,019 A | 12/1923 | William |
| 2,273,954 A | 2/1942 | Grass |
| 2,363,085 A | 11/1944 | Roye |
| 2,393,424 A | 1/1946 | Selch |
| 2,455,644 A | 12/1948 | Barnes |
| 2,482,535 A | 9/1949 | Bayless |

(Continued)

FOREIGN PATENT DOCUMENTS

| CA | 1137338 A | 12/1982 |
| EP | 0055307 A1 | 7/1982 |

(Continued)

OTHER PUBLICATIONS

80 Percent Arms Inc., "AR-15 Easy Jig® Manual," dated 2016, 20 pages.

(Continued)

*Primary Examiner* — Yaritza Guadalupe-McCall
(74) *Attorney, Agent, or Firm* — Knobbe Martens Olson & Bear LLP

(57) ABSTRACT

A jig for machining portions a firearm lower receiver blank. The jig can include a side plate assembled with a top plate. The top plate can include an access aperture for machining the fire control group aperture within the blank. The side plate can include drill apertures for drilling out trigger, hammer, and selector holes. The jig can include an adjustable alignment mechanism for aligning a top surface of the blank with the top plate. The jig can include a hand drill stabilizer for attachment with the side plates.

17 Claims, 12 Drawing Sheets

(56) References Cited

U.S. PATENT DOCUMENTS

| | | | |
|---|---|---|---|
| D160,734 S | 10/1950 | Polkosnik | |
| 2,538,173 A | 1/1951 | Swebilius | |
| 2,543,917 A | 3/1951 | Lloyd | |
| 2,601,809 A | 7/1952 | Di Nardo | |
| 2,859,645 A | 11/1958 | Emmons et al. | |
| 2,896,677 A | 7/1959 | Payzant | |
| 3,108,500 A | 10/1963 | Merriman | |
| 3,141,509 A | 7/1964 | Bent | |
| 3,149,534 A | 9/1964 | Stephens | |
| 3,358,375 A | 12/1967 | Lutz | |
| 3,396,613 A | 8/1968 | Hutton | |
| 3,494,229 A | 2/1970 | Judge | |
| 3,555,964 A | 1/1971 | Fleming | |
| 3,785,634 A | 1/1974 | Denker | |
| 3,788,632 A | 1/1974 | Lukas | |
| 3,789,892 A | 2/1974 | Converse et al. | |
| 3,799,687 A | 3/1974 | Anderson | |
| 3,811,163 A | 5/1974 | Frederick et al. | |
| 3,984,192 A | 10/1976 | Wanner et al. | |
| 4,145,160 A | 3/1979 | Wiggins | |
| 4,155,383 A | 5/1979 | Welliver | |
| 4,209,275 A | 6/1980 | Kim | |
| 4,330,229 A | 5/1982 | Croydon | |
| 4,448,406 A | 5/1984 | Hallberg | |
| 4,475,437 A | 10/1984 | Sullivan | |
| 4,484,608 A | 11/1984 | Ferdinand | |
| 4,502,367 A | 3/1985 | Sullivan | |
| 4,505,182 A | 3/1985 | Sullivan | |
| 4,536,107 A | 8/1985 | Sandy et al. | |
| 4,610,581 A | 9/1986 | Heinlein | |
| 4,630,656 A | 12/1986 | Collins | |
| 4,648,761 A | 3/1987 | Mitchell et al. | |
| D291,529 S | 8/1987 | Degen | |
| 4,813,125 A | 3/1989 | Dacey, Jr. | |
| 4,859,824 A | 8/1989 | Ukaji | |
| 4,936,721 A | 6/1990 | Meyer | |
| 4,948,306 A | 8/1990 | Wiedner et al. | |
| 5,017,056 A | 5/1991 | Morash | |
| 5,059,059 A | 10/1991 | Cox | |
| 5,102,271 A | 4/1992 | Hemmings | |
| 5,141,369 A | 8/1992 | Palace | |
| 5,165,827 A | 11/1992 | Miller | |
| 5,311,654 A | 5/1994 | Cook | |
| 5,358,364 A | 10/1994 | Kall | |
| 5,378,091 A | 1/1995 | Nakamura | |
| 5,560,408 A | 10/1996 | DiFranco | |
| 5,725,038 A | 3/1998 | Tucker | |
| 5,967,712 A | 10/1999 | Magill et al. | |
| 6,065,909 A | 5/2000 | Cook | |
| 6,070,352 A | 6/2000 | Daigle | |
| 6,158,487 A | 12/2000 | Licari | |
| 6,394,466 B1 | 5/2002 | Matsumoto et al. | |
| 6,481,937 B1 | 11/2002 | Sommerfeld et al. | |
| 6,520,224 B2 | 2/2003 | Smith | |
| 6,557,730 B1 | 5/2003 | Kaye | |
| 6,742,558 B1 | 6/2004 | Witt | |
| 6,792,711 B2 | 9/2004 | Battaglia | |
| 6,796,050 B2 | 9/2004 | Haimer et al. | |
| 6,813,843 B1 | 11/2004 | Faubion | |
| D528,930 S | 9/2006 | Degen | |
| 7,108,463 B2 | 9/2006 | Hummel | |
| 7,225,539 B2 | 6/2007 | Nowak et al. | |
| 7,269,901 B2 | 9/2007 | Robin | |
| 7,367,763 B2 | 5/2008 | Ruy Frota de Souza | |
| D571,233 S | 6/2008 | Rys, Jr. | |
| 7,588,400 B2 | 9/2009 | Taylor | |
| 7,641,425 B2 | 1/2010 | Sommerfeld et al. | |
| 7,871,224 B2 | 1/2011 | Dost et al. | |
| 8,052,355 B2 | 11/2011 | Hirukawa et al. | |
| 8,241,297 B2 | 8/2012 | Ashman | |
| 8,327,749 B2 | 12/2012 | Underwood | |
| 8,573,906 B2 | 11/2013 | Gowker | |
| 8,584,372 B2 | 11/2013 | Stoffel | |
| 9,009,986 B1 * | 4/2015 | Chang | F41A 3/66 33/640 |
| 9,662,717 B2 | 5/2017 | Prom et al. | |
| 9,810,517 B2 | 11/2017 | Chang et al. | |
| D804,926 S | 12/2017 | Atkinson | |
| 9,982,958 B1 * | 5/2018 | Partington | F41A 3/66 |
| D824,741 S | 8/2018 | Davis | |
| 10,099,329 B1 * | 10/2018 | Smith | B23Q 3/062 |
| 10,145,633 B1 * | 12/2018 | Partington | B23Q 17/2233 |
| 2002/0021945 A1 | 2/2002 | Harpaz et al. | |
| 2004/0065387 A1 | 4/2004 | Smith | |
| 2004/0179906 A1 | 9/2004 | Hughes et al. | |
| 2005/0025588 A1 | 2/2005 | Effrem | |
| 2005/0086788 A1 | 4/2005 | Wasileski et al. | |
| 2005/0120573 A1 | 6/2005 | Port | |
| 2010/0074701 A1 | 3/2010 | Kempen et al. | |
| 2010/0303568 A1 | 12/2010 | York | |
| 2011/0280676 A1 | 11/2011 | Nordlin | |
| 2012/0005937 A1 | 1/2012 | Milino | |
| 2013/0028675 A1 | 1/2013 | Vogler et al. | |
| 2015/0040414 A1 | 2/2015 | Nakamura et al. | |
| 2015/0128396 A1 | 5/2015 | Motomura | |
| 2017/0209941 A1 | 7/2017 | Chang et al. | |
| 2018/0058835 A1 | 3/2018 | Chang et al. | |
| 2018/0297160 A1 | 10/2018 | Smith | |

FOREIGN PATENT DOCUMENTS

| | | |
|---|---|---|
| FR | 1075194 A | 10/1954 |
| GB | 1008029 A | 10/1965 |

OTHER PUBLICATIONS

5D Tactical LLC, A New Dimension in Firearms, "AR-15 & AR-308 Router Jig Instructions," dated as created Dec. 14, 2016 (as indicated by the PDF file metadata), 11 pages.

Modulus Arms, "Universal AR-15 80% Lower Receiver Jig Instructions," Mar. 25, 2015, 19 pages.

Modulus Arms, "AR-308/AR-10 Jig Instructions," Oct. 20, 2014, 24 pages.

Usmcdoc14, "More how to and tips for milling an 80% AR lower . . . without a mill!" available at <https://www.youtube.com/watch?v=tJzwylo4Sx8>, as published on Feb. 4, 2013.

Kreg Tool, Quick-Start Guide, Jig Product Manual, dated 2010, 27 pages.

Kreg Newsletter, "4 Tips for Tight-Fitting Kreg Joints," available at <http://www.kregtool.com/files/newsletters/kregplus/may13.html>, published May 2013, dated Aug. 2013, 4 pages.

DIYdiva, "Joinery 101: Using a Kreg Jig," available at <http://diydiva.net/2011/07/joinery-101-using-a-kreg-jig/>, published on Jul. 18, 2011.

Modulus Arms, "Heavy-Duty Universal AR-15 80% Lower Receiver Jig Instructions," dated Jan. 14, 2016, 21 pages.

Iconic Industries Inc., "Legacy Instructions for Iconic Brand Jigs," <https://www.iconicindustriesinc.com/finishing-fixturesjigs>, for purposes of examination, consider published before Apr. 18, 2017, pp. 3-25.

80 Percent Arms Inc., "Easy Jig® Gen 2 Multi-Platform Milling System User Manual" dated 2017, 15 pages.

* cited by examiner

JIG FOR FIREARM LOWER RECEIVER MANUFACTURE

PRIORITY

This application claims the benefit of U.S. Provisional Patent Application No. 62/540,534, filed Aug. 2, 2017, the entirety of which is hereby incorporated by reference, and U.S. Provisional Patent Application No. 62/552,368, filed Aug. 30, 2017, the entirety of which is hereby incorporated by reference.

BACKGROUND

Field

The present disclosure generally relates to machining portions of a firearm lower receiver, and more specifically to machining a firearm lower receiver from a blank using a jig.

Related Art

Firearms are widely used, and among the most common firearms are the AR-15, AR-9, and AR-10 semi-automatic rifles. Such firearms are comprised of several different components, which generally include a lower receiver, an upper receiver, a stock and a barrel. Although several components are included in the firearm, it is typically only the lower receiver that is technically classified as a firearm in the United States and the subject of regulation. In this regard, while most components of a firearm may be readily acquired, the regulations governing firearms tend to make it much more difficult to acquire a lower receiver.

In view of the regulations controlling access to lower receivers, there is a market for partially manufactured lower receivers, referred to herein as "blanks," which are not subjected to the regulations covering completed lower receivers. Such partially manufactured lower receiver are approximately 80% complete, and are sold to consumers, who then complete the approximately final 20% of the manufacturing.

Understanding that most consumers are not professional machinists, several kits or jigs have been made available to allow consumers of lower receiver blanks to more easily complete the final 20% of the manufacturing process to form the completed lower receiver. The jigs typically are configured to hold the lower receiver blank in place, and to provide one or more cutting templates for machining the various structures needed to form the completed lower receiver.

SUMMARY

According to one aspect of the present disclosure, a jig for machining portions of a firearm lower receiver blank includes an adjustable alignment mechanism. The adjustable alignment mechanism can be extendable from a lower surface of a top plate of the jig. The adjustable alignment mechanism is adapted to contact and align a top surface of the blank with the top plate. In one implementation, the adjustable alignment mechanism is a threaded knob. By screwing down the threaded knob it applies equal pressure across the top of the receiver blank. This causes the lower receiver to "self level" in the jig.

One of the benefits of the adjustable alignment mechanism is that some existing jigs have a certain amount of "slop" or looseness (e.g., to accommodate manufacturing tolerances of the lower receiver) that can allow a user to assemble the receiver blank in the jig at an angle. After machining, this can result in uneven wall thickness of the lower receiver's trigger pocket area and/or angled holes for the selector pin, trigger pin, and hammer pin. The adjustable alignment mechanism can help prevent these manufacturing defects.

According to another aspect of the present disclosure, the jig can include a hand drill stabilizer. The hand drill stabilizer can be coupled with a side plate of the jig. The hand drill stabilizer can include a set of drill apertures that correspond and align with a set of drill apertures of the side plate. The hand drill stabilizer thereby can extend a depth of the set of drill apertures of the side plate.

According to another aspect of the present disclosure, the jig can include a guide insert. The guide insert can include a pilot hole forming aperture adapted to align a drill bit with the top surface of the blank to drill a pilot hole therein. The guide insert can include a chip slot extending through a wall of the pilot hole forming aperture. The chip slot can be adapted to remove chips from the pilot hole forming aperture during drilling of the top surface.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

Figure 1:
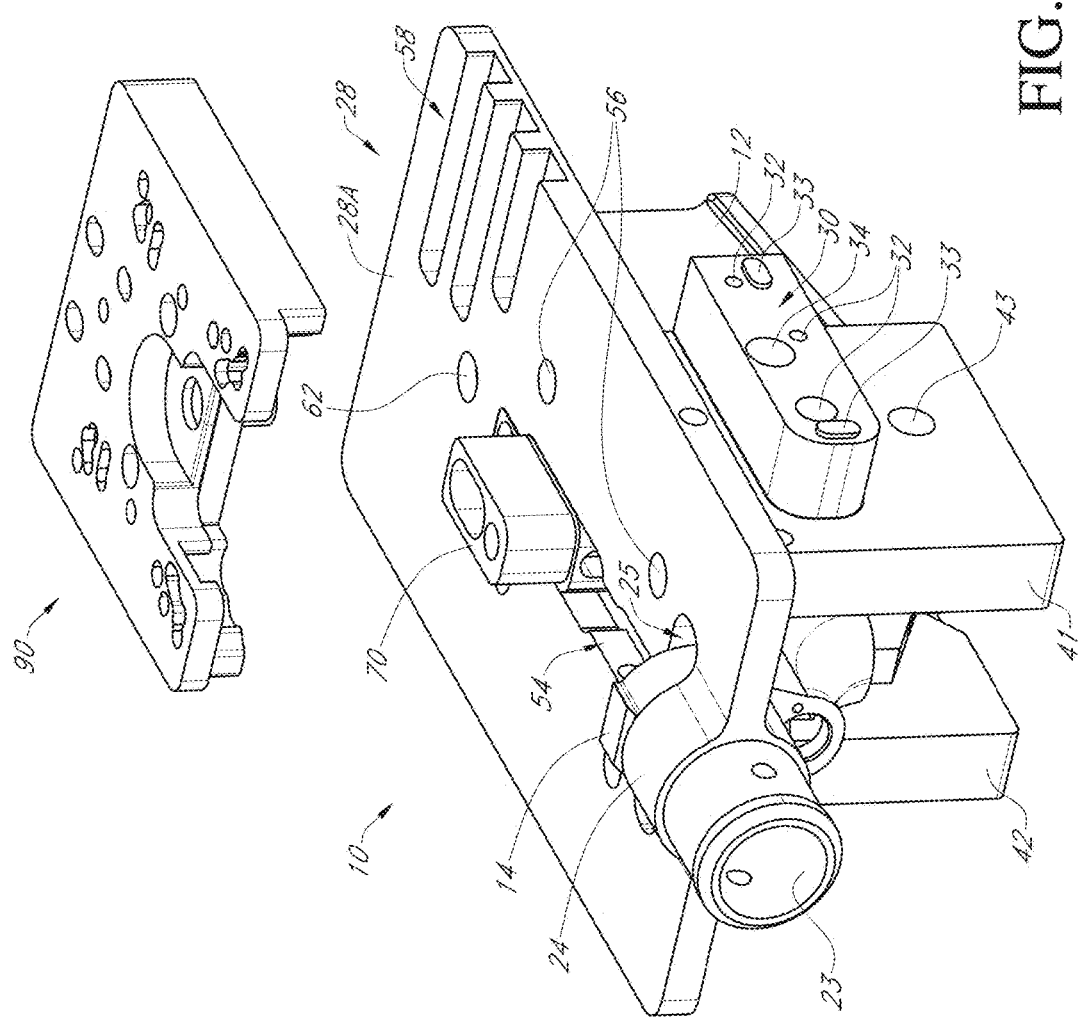
FIG. 1 is a top perspective view of an exemplary jig for manufacturing a lower receiver from a blank.
Figure 2:
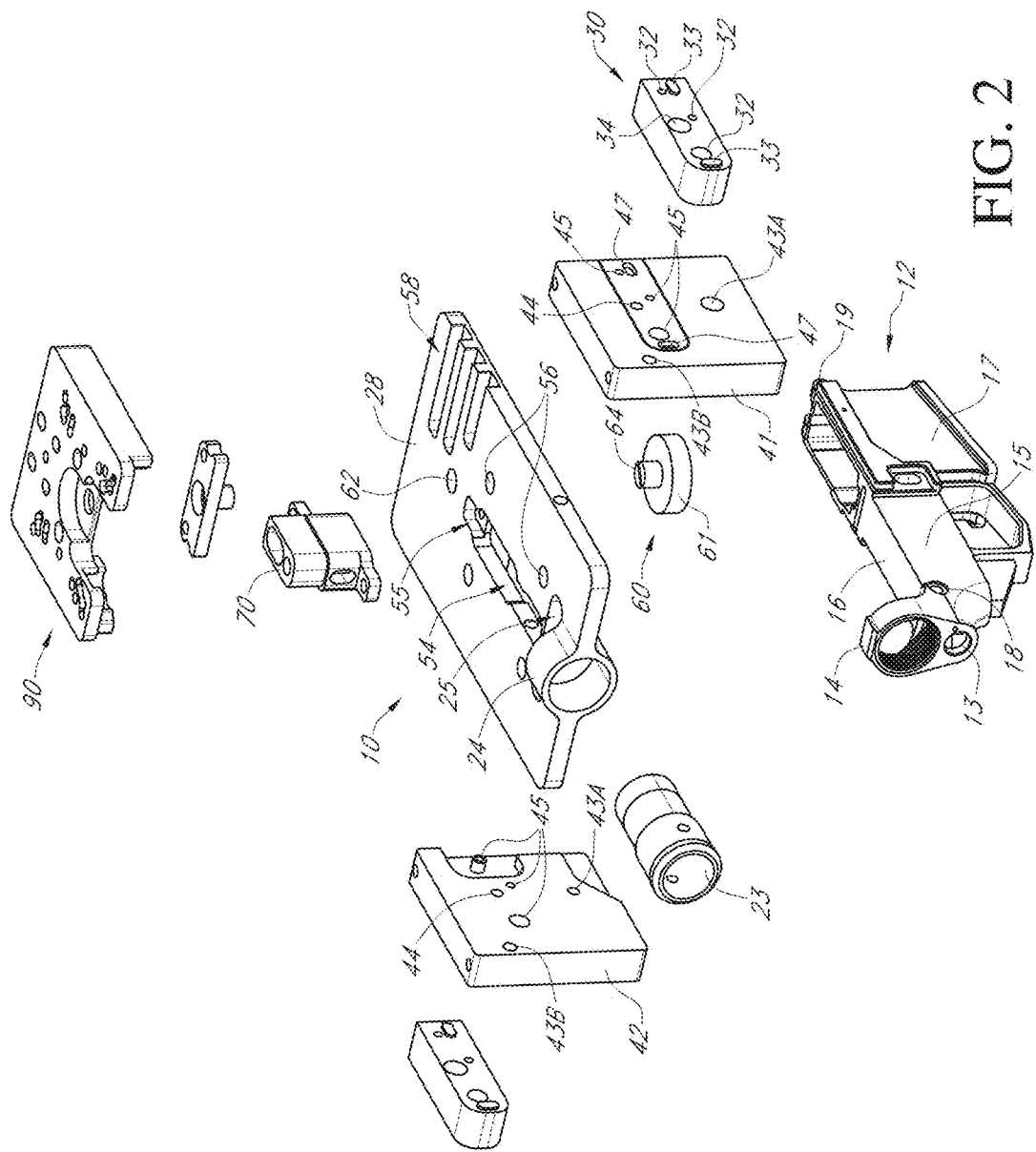
FIG. 2 is an exploded view of the jig of FIG. 1.
Figure 3:
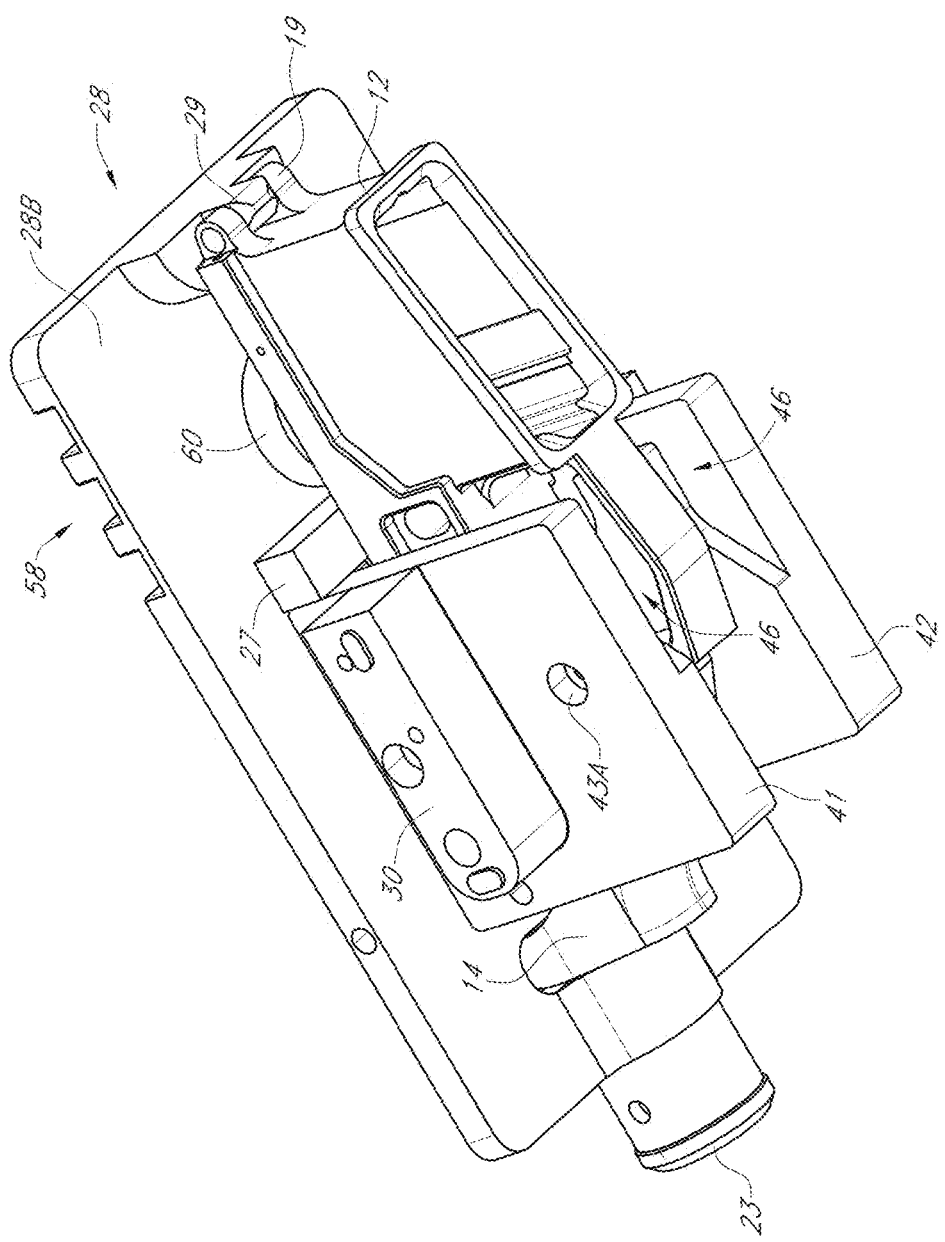
FIG. 3 is a bottom perspective view of the jig of FIG. 1.
Figure 4:
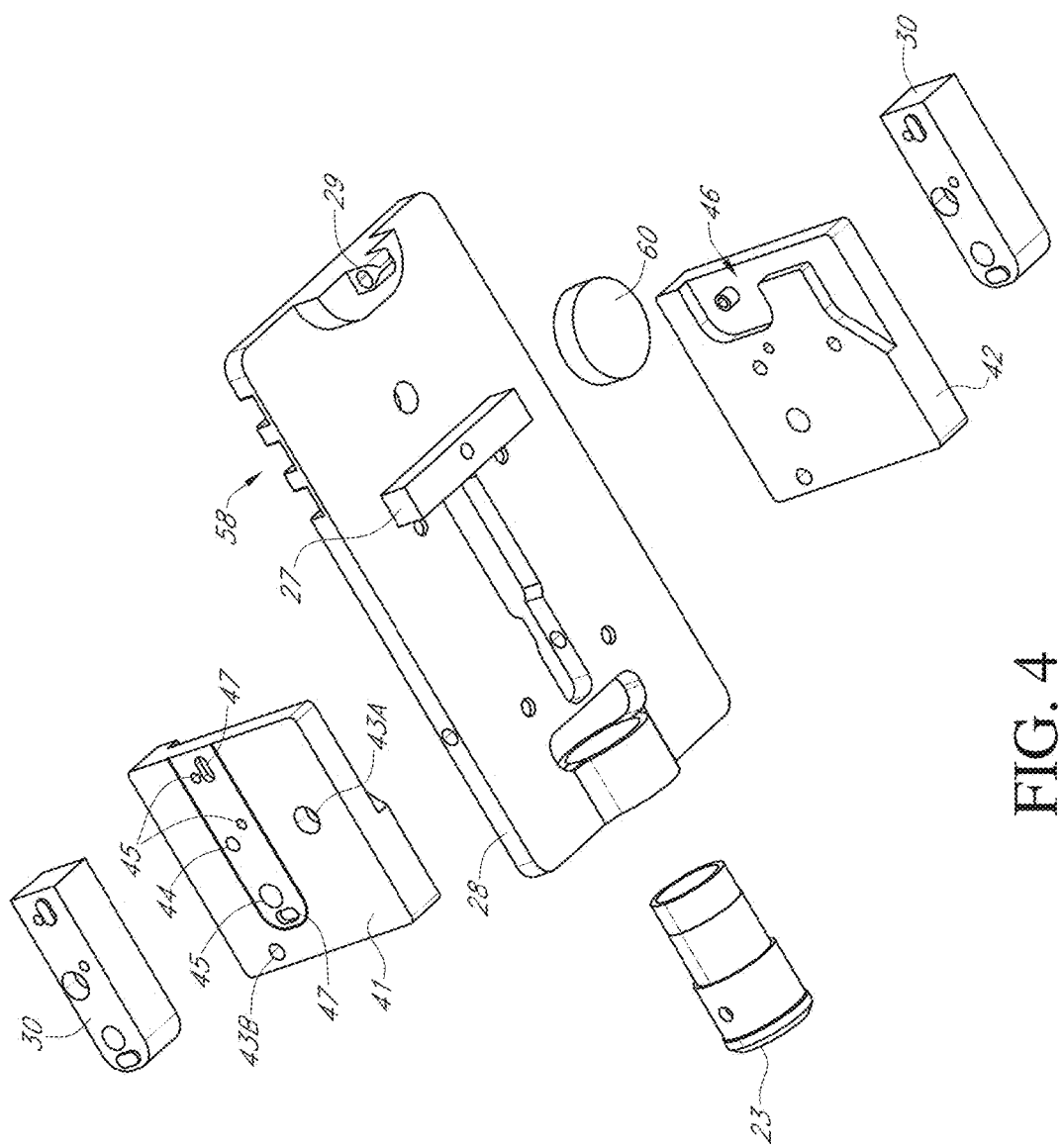
FIG. 4 is an exploded view of the jig of FIG. 1 without the blank.
Figure 8B:
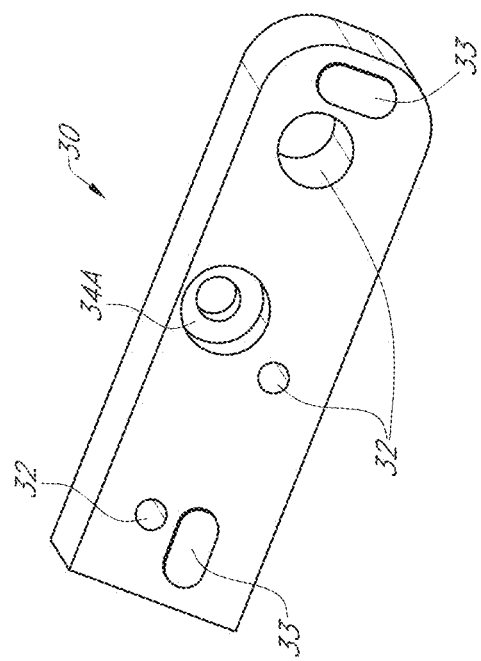
Figure 8A:
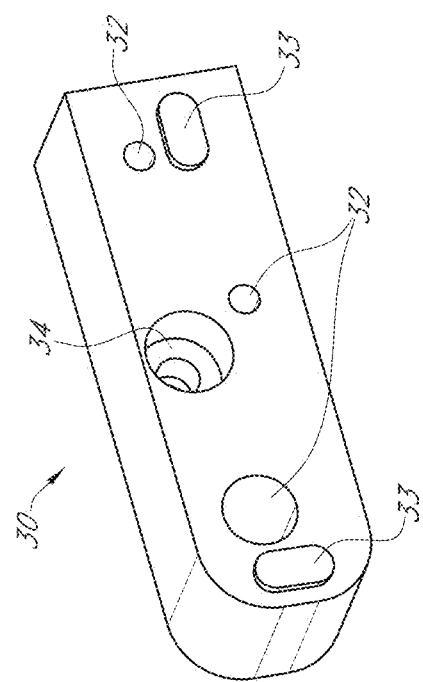
Figure 10:
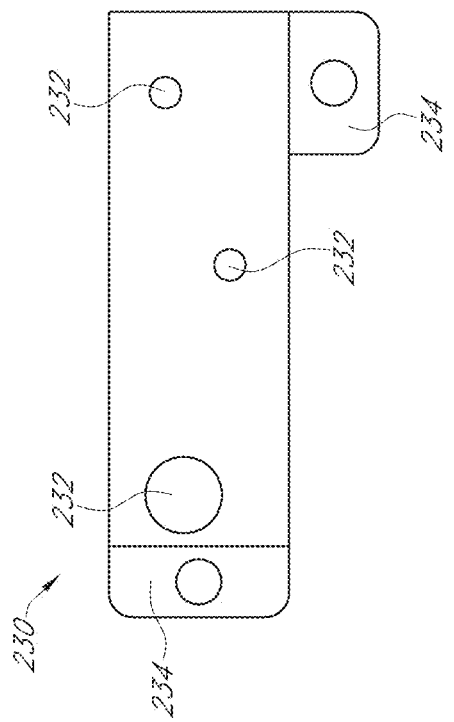
Figure 9:
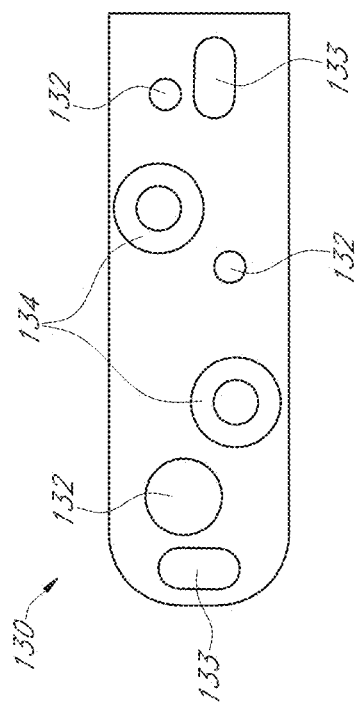
Figure 11B:
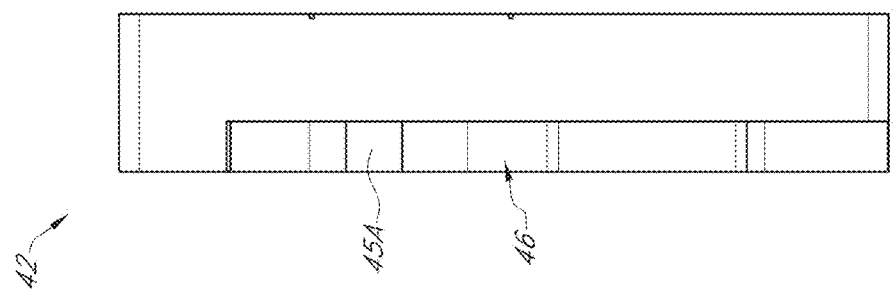
Figure 11A:
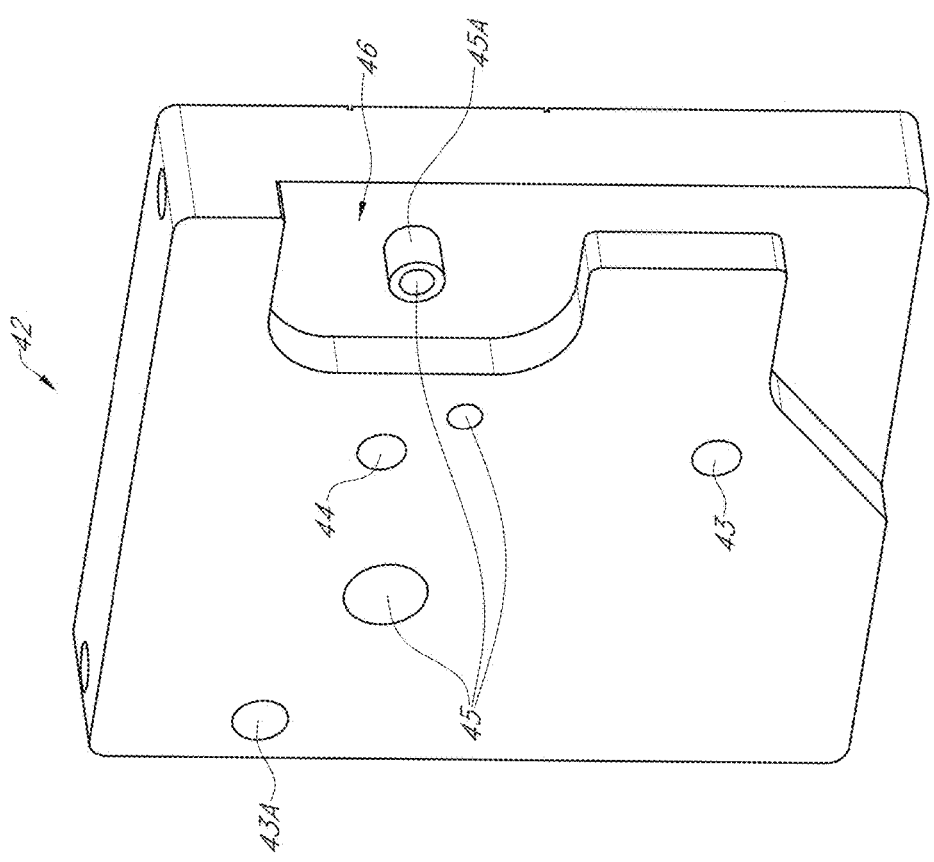
Figure 12B:
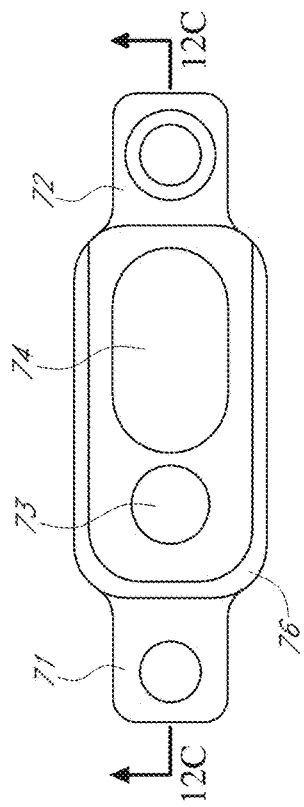
Figure 12A:
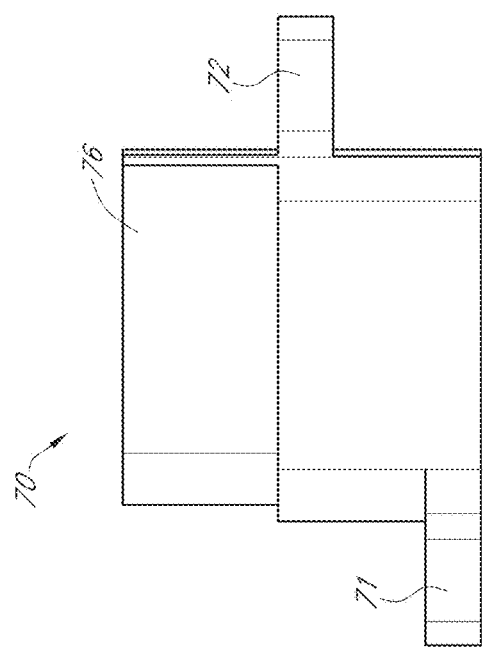
Figure 12C:
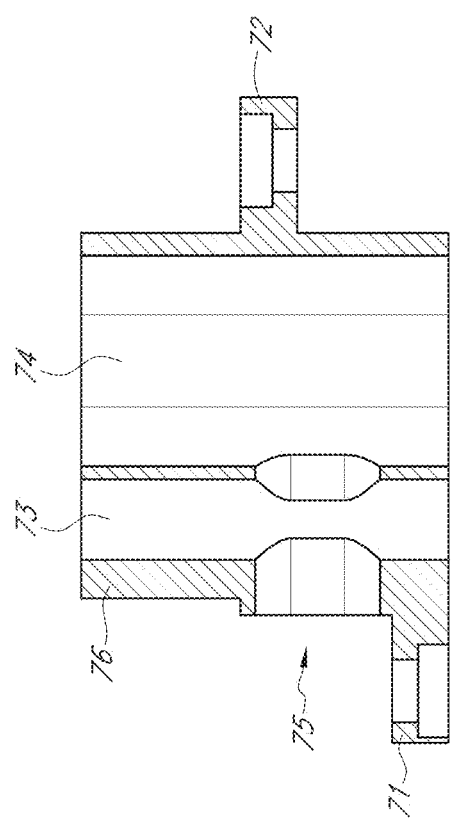

FIGS. 8A-B are perspective views of a hand drill stabilizer;

FIG. 9 shows another embodiment of a hand drill stabilizer;

FIG. 10 shows another embodiment of a hand drill stabilizer;

FIGS. 11A-B show a side plate of the jig of FIG. 1;

FIG. 12A is a side view of a guide insert;

FIG. 12B is a top view of the guide insert of FIG. 12A;

FIG. 12C is a section view taken along the line 12C-12C in FIG. 12B.

DETAILED DESCRIPTION

The various features and advantages of the systems, devices, and methods of the lower receiver manufacturing technology described herein will become more fully apparent from the following description of the embodiments illustrated in the figures. These embodiments are intended to illustrate the principles of this disclosure, and this disclosure should not be limited to merely the illustrated examples. The features of the illustrated embodiments can be modified, combined, removed, and/or substituted as will be apparent to those of ordinary skill in the art upon consideration of the principles disclosed herein. In particular, although described in the context of a jig for machining an AR-15 or AR-9 lower receiver, the concepts and features disclosed herein can be utilized in jigs for manufacturing lower receivers for other types of firearms.

FIGS. 1-4 illustrate a machining tool assembly or jig 10 for machining a lower receiver blank 12. In this regard, the "blank" used with the machining tool assembly 10 has already been premanufactured to include several structural attributes of the finished firearm lower receiver. In some instances, the blank 12 is approximately 80% complete, with the remaining 20% being completed by the purchaser of the blank 12. When fully machined, the blank 12 can be operable as a lower receiver for a rifle, such as an AR-15, AR-9, AR-10, or other firearm. As such, the jig 10 is specifically configured and adapted to allow a user to easily complete the process of machining the blank 12 to form all of the structural features of the firearm lower receiver.

The jig 10 includes various configurations for machining different portions of the blank 12, as summarized herein. These configurations and the process for machining the blank 12 using the jig 10 are more fully disclosed in U.S. application Ser. No. 15/954,935, filed Apr. 17, 2018, the entirety of which is hereby incorporated by reference.

The blank 12 can include a central body 15 having a top surface 16. In one implementation, the top surface 16 resides in a single plane. A magazine well 17 is connected to one end of the central body 15. An internally threaded buffer tube 14 is connected to the opposed end of the central body 15. The blank 12 can include a rear takedown aperture 18 adjacent the buffer tube 14. The blank 12 can include a forward takedown aperture 19 adjacent the magazine well 17. In some implementations of the jig 10, one or both of the forward and rear takedown apertures 19, 18 can be used to mount the blank 12 to the jig 10. In some implementations of the jig 10, the buffer tube 14 can be used to mount the blank 12 to the machining tool assembly 10, as described below.

The jig 10 includes a top plate 28. The top plate 28 can include an upper surface 28A and a lower surface 28B. The upper surface 28A can include an access aperture 54 extending between the upper and lower surfaces 28A, 28B. The access aperture 54 can align with the top surface 16 of the blank 12 when assembled with the jig 10. In one implementation, the access aperture 54 defines a periphery having regions of varying width which correspond to the periphery of a cavity (e.g., a fire control group cavity) that is to be machined into the top surface 16 of the central body 15. In another implementation, the access aperture is generally rectangular.

The top plate 28 can include at least one depth gauge 58 formed therein. In the exemplary embodiment, the template plate 28 includes three depth gauges in the form of grooves extending into the top plate 28. The depth gauge(s) can be used to set the depth of an end mill during the process of machining the blank 12.

One end of the top plate 28 can include a sleeve aperture 24. The sleeve aperture 24 can attach the blank 12 with the top plate 28 using a buffer screw 23. In one implementation, the sleeve aperture 24 is formed integrally with the top plate 28. In another implementation, the sleeve aperture 24 is assembled (e.g., bolted, clamped, or otherwise mechanically attached) with the top plate 28. The top plate can include a buffer tube aperture 25 sized to receive the buffer tube 14 of the blank 12. The buffer tube 14 can extend above the upper surface 28A through the buffer tube aperture 25.

The buffer screw 23 can include external threads corresponding to the internal threads of the buffer tube 14. The sleeve aperture 24 can be sized to receive the buffer screw 23 therein. The blank 12 can be attached with the top plate 28 by inserting the buffer tube 14 into the buffer tube aperture 25, radially aligning the buffer tube 14 with the sleeve aperture 24, and inserting the buffer screw 23 through the sleeve aperture 24 into the buffer tube 14. The threads of the buffer tube 14 and the buffer screw 23 can engage to secure the blank to the top plate 28. In an alternative embodiment, the buffer screw 23 and sleeve aperture 24 can be aligned with a rear recess 13 of the blank 12.

Another end of the top plate 28 (opposed to the sleeve aperture 24), can include a forward aperture 29 for attaching the blank 12 with the top plate 28. The forward takedown aperture 19 of the blank 12 can be aligned with the forward aperture 29. A forward pin (not shown) can be advanced through the forward takedown aperture 19 and the forward aperture 29 to secure the blank 12 with the top plate 28. In one implementation, the forward aperture 29 can be part of a separable portion of the top plate 28. For example, the jig 10 can be configured to receive any of various separable portions having one or more forward apertures 29 located at different positions (e.g., to accommodate differently sized blanks 12).

The jig 10 can include one or more side plates 41, 42. The side plates 41, 42 can be attached with the top plate 28. The top plate 28 can include one or more apertures 56 for receiving one or more bolts for attaching the side plates 41, 42. The blank 12 can be disposed between the side plates 41, 42.

Each side plate 41, 42 can include a plurality of drill apertures 45 extending therethrough. The drill apertures 45 are used to position a drill bit relative to the central body 15 of the blank 12 for drilling out trigger, hammer, and selector holes, or other types of holes. In some implementations (not shown), each side plate 41, 42 includes multiple sets of drill apertures 45 corresponding to different receiver blanks for different firearms. In some implementations, the side plates 41, 42 are mirror images, containing the same structures on each, as described herein.

The side plates 41, 42 can include a threaded aperture 43A. The threaded aperture 43A can receive a threaded bolt (not shown). The threaded bolt can be received within both the threaded apertures 43A of the side plates 41, 42. The bolt creates a solid rod connection between the side plates 41, 42 and allows jig 10 to be held in a vice without bending.

In some implementations, the alignment holes 43 can be aligned with one or more holes on the blank 12. For example, the blank 12 can include the rear takedown aperture 18. An alignment hole 43B can be aligned with the rear takedown aperture 18 and a pin extended therethrough to align the side plate(s) 41, 42 with the blank 12.

The jig 10 can include a router plate 90. The router plate 90 can attach to a router (not shown). A lower surface of the router plate 90 can be slidable over the upper surface 28A of the top plate 28. The router plate 90 can be used to align an end mill connected with the router to the central body 15 of the blank 12. The end mill can extend through the access aperture 54 to machine the central body 15 (e.g., machine the fire control group pocket). In some implementations, the router plate 90 can be guided by the profile of the access aperture 54. In some other implementations, the router plate 90 can be guided by one or more corresponding pins and apertures in the router plate 90 and the top plate 28.

Adjustable Alignment Mechanism

In some implementations of the jig 10, the top plate 28 includes a support bar 27 extending from the lower surface 28B. The support bar 27 can engage with the top surface 16 of the blank 12 to align the blank 12 with the top plate 28 and to prevent rotation of the blank 12 when assembled therewith.

However, to allow for manufacturing tolerances, existing jigs having a support bar 27 typically require there be a small gap between the support bar 27 and the top surface 15 of the blank 12. An aspect of the present disclosure is the realization that this small gap in some cases allows the blank 12 to angle a small amount when assembled with the top plate 28. This may result in uneven machining of the blank 12. For example, when the central body 15 is milled through the access aperture 54, the small angle can create uneven thickness of the walls of the blank's fire control group pocket. As another example, the trigger, hammer, and selector holes, which are drilled through both sides of the blank 12 can be misaligned because of the small angle.

Moreover, the connection of the blank 12 with the top plate 28 (e.g., through the forward aperture 29 and/or the buffer tube screw 123, as described above) must allow for manufacturing tolerances of the blank 12. Another aspect of the present disclosure is the realization that this can result in misalignment of the top surface 16 relative to the top plate 28 and/or a looseness in the connection between the blank 12 and the top plate 28. This looseness and/or misalignment can result in uneven and/or defective machining of the blank 12.

Figure 5:
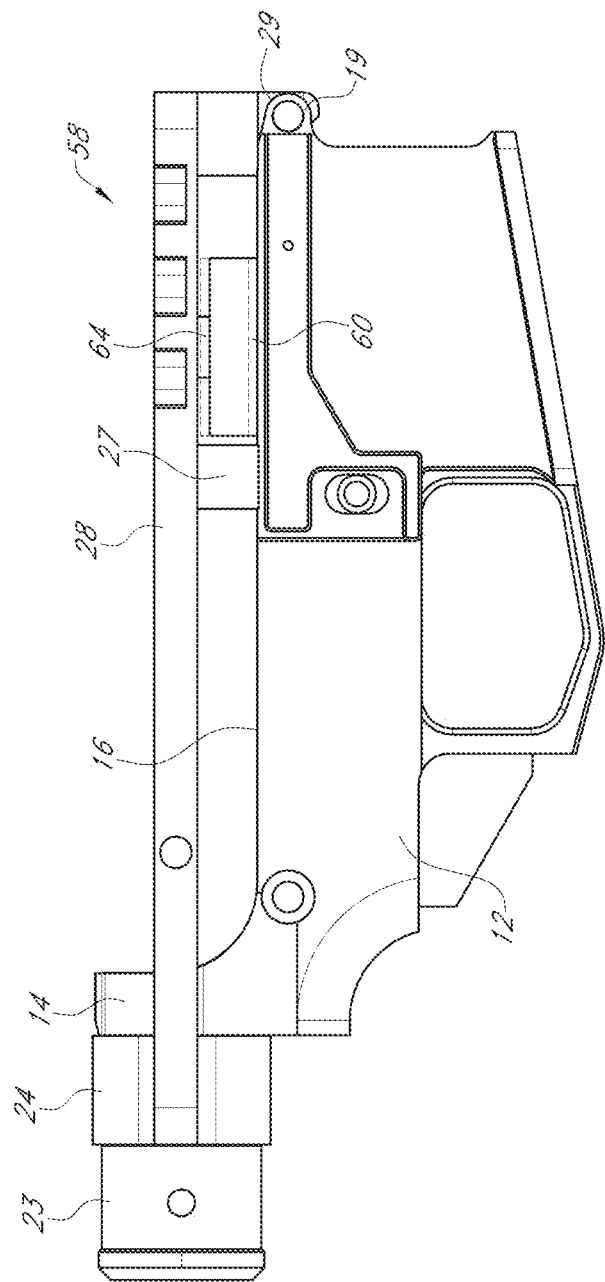
FIG. 5 is a side view of the jig of FIG. 1 showing an adjustable alignment mechanism.
Figure 6:
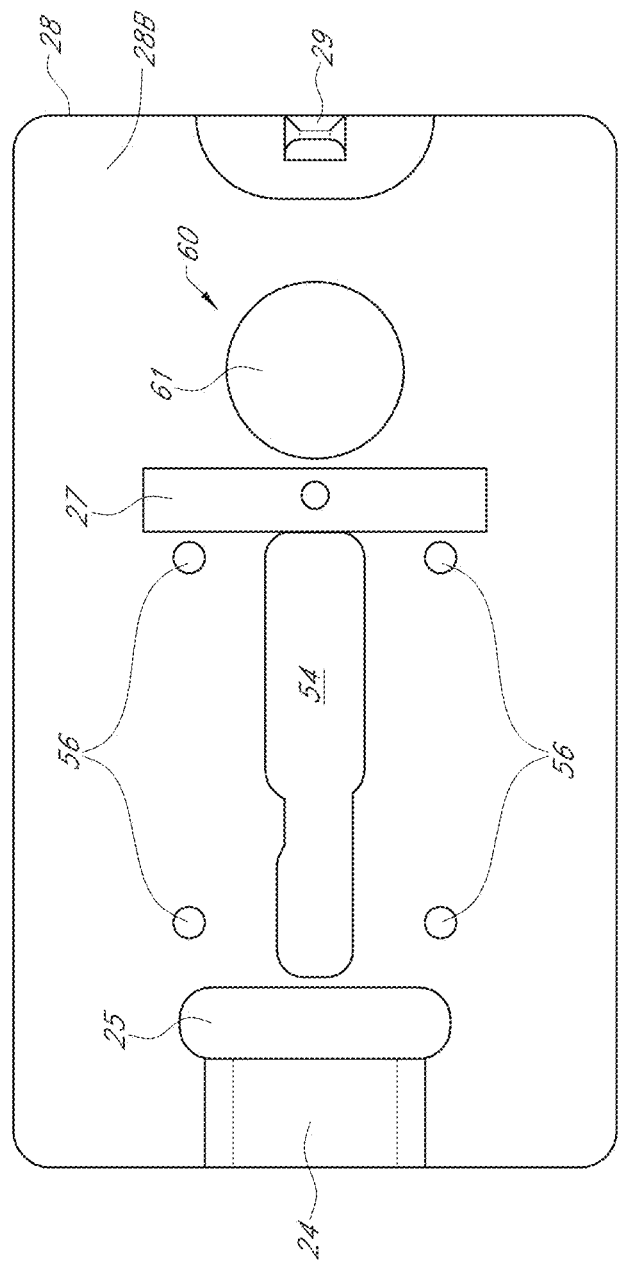
FIG. 6 is a bottom view of the jig of FIG. 1 showing the adjustable alignment mechanism.
Figure 7:
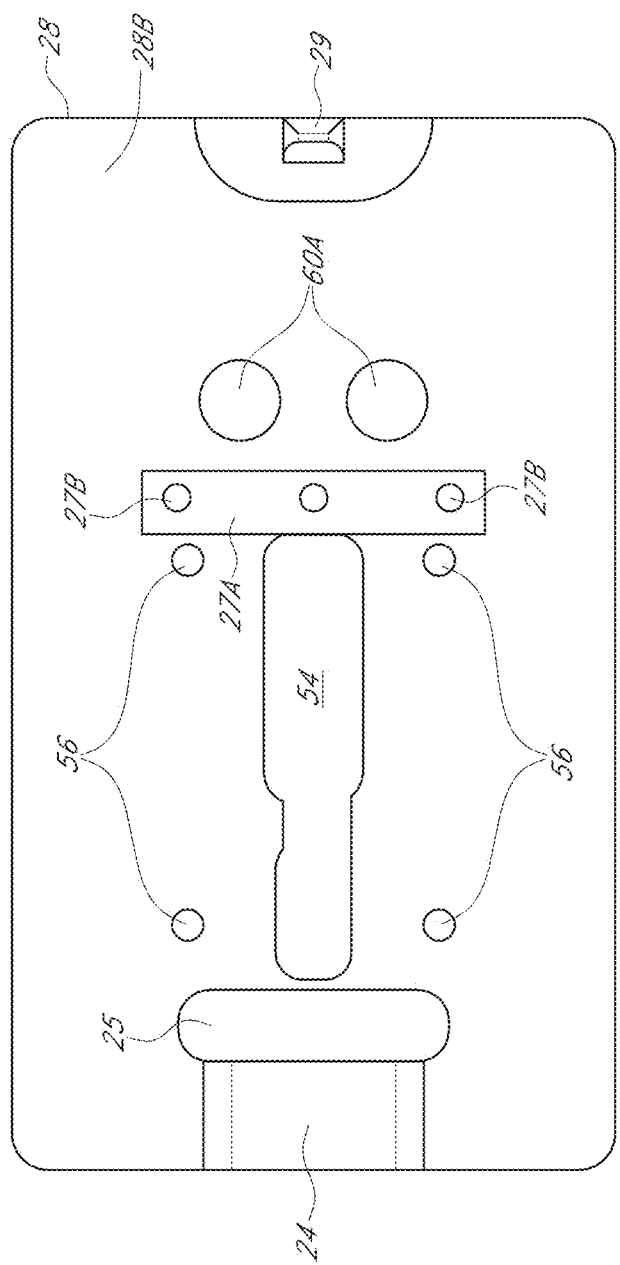
FIG. 7 is a bottom view of the jig of FIG. 1 showing another embodiment of an adjustable alignment mechanism.

Thus, in one embodiment, the jig 10 can include an adjustable alignment mechanism 60, as illustrated further FIGS. 5-7. The adjustable alignment mechanism 60 can be a threaded adjustment knob including a threaded shaft 64 coupled with a grip end 61. The threaded shaft 64 can be engaged within a correspondingly threaded aperture 62 in the top plate 28. In one implementation, the threaded shaft includes a slot for rotating the threaded adjustment knob (e.g., with a screwdriver).

The grip end 61 can be a circular disk, as illustrated. The circular disk can facilitate rotation of the threaded adjustment knob at the grip end 61; however, the grip end 61 is not limited to being disc shaped and can be any suitable shape. In one implementation, the grip end 61 is larger in at least one dimension than at least one dimension of the top surface 16 of the blank 12. For example, the circular disk can have a diameter larger than a width of the blank 12. This can facilitate gripping of the grip end 61 by a user to provide rotation to the threaded adjustment knob.

The grip end 61 can include a lower surface. The lower surface can be parallel with the upper surface 28A of the top plate 28. As the grip end 61 is rotated, the threaded shaft 64 moves in a vertical direction relative to the aperture 62 of the top plate 28. The grip end 61 can remain parallel with the upper surface 28A of the top plate 28 during rotation. The lower surface of the grip end 61 can engage with the top surface 16 of the blank 12. This engagement can align the blank 12 and/or prevent movement of the blank 12 with respect to the top plate 28. The user can tighten the engagement between the threaded adjustment knob and the blank 12 (e.g., to ensure alignment of the blank 12) by rotation of the grip end 61.

In one implementation, the adjustable alignment mechanism 60 is centered or approximately centered over the blank 28, as illustrated in FIG. 6. For example, the threaded aperture 62 can be centered on the top plate 28.

In another implementation, the adjustable alignment mechanism 60 comprises multiple threaded knobs 60A, as illustrated in FIG. 7. The threaded knobs 60A can extend from the top plate 28 and be independently and adjustably aligned with the top surface 16 at various points. The blank 12 can be aligned relative to the top plate 28 by adjustment of the threaded knobs 60A.

In another implementation, alignment or leveling of the blank 12 can also be done using a floating straight bar 27A that can be pressed down against the blank 12 in a variety of methods to achieve the same results of the threaded knob. In one implementation, the floating straight bar 27A can include one or more adjustment points (e.g., threaded shafts 27B) for adjusting the angle and/or position of the floating straight bar 27A.

Alignment or leveling of the blank 12 in the jig 10 can also be achieved by inserting a shim between the alignment bar 27 and the blank 12. However, the use of shims or an adjustable alignment mechanism 60 with multiple independent adjustment points (e.g., the threaded knobs 60A and the floating straight bar 27A) can be more complicated to ensure application of equal even pressure to align or level the blank 12. Desirably, the jig 10 includes the adjustable alignment mechanism 60 including a single, centered threaded knob.

In an alternate implementation, the threaded shaft 64 can be fixedly engaged with the top plate 28. The lower end 61 can include the correspondingly threaded aperture 62 and the lower end can move vertically with respect to the fixed threaded shaft 64.

Hand Drill Stabilizer

Not all users of the jig 10 have access to a drill press for drilling out the trigger, hammer, and selector holes through the drill apertures 45. Often these users complete the blank 12 using a hand drill. While, the drill press provides stability for machining the blank 12, a hand drill is often unsteady, leading to inferior machining results. A hand drill stabilizer 30 effectively increases the thickness of the jig side plates 41, 42 thereby limiting unwanted movement of the drill during machining. The hand drill stabilizer 30 provides additional support for the drill bit and reduces the possible angular deviation of the drill bit during machining.

With reference to FIGS. 1-4 and 8A-10, the hand drill stabilizer 30 can include a set of drill apertures 32. The drill apertures 32 can correspond to and align with the drill apertures 45 of the side plate 41. The drill apertures 32 function to extend a depth of the drill apertures 45 by the thickness of the hand drill stabilizer 30. In one implementation, the thickness of the hand drill stabilizer is between approximately 0.5" and 1.5". In one implementation, the hand drill stabilizer 30 has a thickness at least as great as the side plate 41 and the depth of the drill apertures 32 is at least as great as the depth of the drill apertures 45.

The hand drill stabilizer 30 can be formed of a rigid material, such as a hardened steel or other metal. Although this disclosure is not limited to steel or metal, hardened steel can prolong the life of the hand drill stabilizer 30 by reducing wear on the interior of the drill apertures 32. In some implementations, the side plates 41, 42 can be of the same material as the hand drill stabilizer 30.

The hand drill stabilizer 30 can attach to an outer face of the side plate 41. In some implementations, the hand drill stabilizer 30 can include one or more indexes 33 (such as cavities or pins) for aligning with the side plate 41. The outer face of the side plate 41 can include corresponding indexes 47 paired with the indexes 33 (shown in FIG. 2). Desirably, the hand drill stabilizer 30 includes multiple indexes 33 to ensure alignment of the hand drill stabilizer 30.

In one implementation, the hand drill stabilizer 30 can be reversibly used on either of the side plates 41, 42. For example, the hand drill stabilizer 30 can include indexes 33 on one side and indexes 33 on the reverse side, as illustrated in FIGS. 8A-8B. The side plate 42 can include the corresponding indexes 47. This allows the hand drill stabilizer 30 to be used alternately on the side plate 41 or the side plate 42.

The hand drill stabilizer 30 can be removably coupled with the side plate 41. In one implementation, the hand drill stabilizer 30 includes an bolt aperture 34 and the side plate 41 (and/or side plate 42) includes a corresponding aperture 44. Optionally, the bolt aperture 34 can be countersunk on one or both sides of the hand drill stabilizer 30. A bolt (not shown) can be inserted through the bolt aperture and into the aperture 44 to attach the hand drill stabilizer 30 with the side plate 41 (and/or side plate 42). Optionally the aperture 44 can be threaded.

FIG. 9 illustrates a variation of a hand drill stabilizer 130. The hand drill stabilizer 130 includes two or more bolt apertures 134. The hand drill stabilizer 130 can also include on or more indexes 133 and drill apertures 132.

FIG. 10 illustrates another variation of a hand drill stabilizer 230. The hand drill stabilizer 230 includes a lip or one or more tabs 234 attached with the hand drill stabilizer 230. The tabs 234 can allows the hand drill stabilizer 230 to be bolted and/or clamped to the side plates 41 or 42. The hand drill stabilizer 230 can also include indexes 233 and drill apertures 232. In some implementations, the hand drill stabilizer 30 can be adhered to the side plate 41.

The hand drill stabilizer 30 provides several advantages. The hand drill stabilizer 30 provides better support of a drill bit and reduces angular deviation during machining. The hand drill stabilizer 30 reduces wear to the side plates (e.g., the drill apertures 45) and thereby ensures that holes are drilled more accurately. The hand drill stabilizer 30 can also be used as a repair for a worn out or damaged side plate.

Side Plates Cavities

FIGS. 11A-11B illustrate an embodiment of the side plate 42. In some implementations of the jig 10, the side plate 41 is a mirror image of the side plate 41, having corresponding structures as shown in FIGS. 11A-B and described herein. The side plate 42 can include the drill apertures 45 and the alignment holes 43A, 43B. As noted above, the side plate 42 can include an aperture 44 for connecting the hand drill stabilizer 30.

The side plate 42 can include a cutout section 46. The cutout section 46 can generally correspond to the one or more portions of the profile of the blank 12. The cutout section 46 can allow the side plates 41, 42 to be assembled closer together in the jig 10. The cutout section 46 can also allow side plates 41, 42 to be assembled at least partially around one or more portions of the blank 12.

In some implementations, the side plate 42 includes a sleeve 45A. The sleeve 45A can surround one of the drill apertures 45. The sleeve 45A can be located within the cutout section 46. The sleeve 45A can allow the drill aperture 45 to extend through the full thickness of the side plate 42, despite the cutout section 46. The sleeve 45A can improve machining accuracy by helping to support and align a drill bit extended through the drill aperture 45.

Chip Ejector

In some configurations, the jig 10 includes a guide insert 70. The embodiment of the guide insert 70 shown in the drawings can be used to form a pilot hole in the central body 14 and/or to mill out a trigger slot in the central body 14. With reference to FIGS. 12A-C, the guide insert 70 includes a main body 76 including a pilot forming aperture 73 and a trigger slot forming aperture 74. The pilot forming aperture 73 extends within the main body 76 generally parallel to the trigger slot forming aperture 74

The main body 76 can include an outer periphery that fits within and/or aligns with the access aperture 54. The guide insert 70 can include one or more connector tabs 71, 72 disposed on opposed sides of the main body 76. Each connector tab 71, 72 can be complementary in shape to an alignment recess 55 of the access aperture 54. Accordingly, the main body 76 of the guide insert 70 can be received within the access aperture 54 and one of the connector tabs 71, 72 can be received within alignment recess 55. With the connector tab 71 in the alignment recess 55, the user can drill the pilot hole into the central body 15 through the pilot forming aperture 73. With the connector tab 72 in the alignment recess 55, the user can mill the trigger slot in the central body 15 through the trigger slot forming aperture 74.

The length of the pilot forming aperture 73 can be relatively tall (e.g., approximately 1.5"). The pilot hole in the central body 15 can also be relatively deep (e.g., approximately 1.34"). This creates a "deep hole" drilling situation. Clearing chips from the drill bit in a deep hole can be difficult and/or slow down the drilling process to ensure the removal of chips before excessive buildup on the drill bit.

A solution to the problem is the inclusion of a vertical slot 75 near into the wall defining the pilot forming aperture 73. For example, the vertical slot 75 can be included through the main body 76 of the guide insert. In some implementations, the vertical slot 75 can extend into the trigger slot forming aperture 74, thus providing another location for evacuating chips. Using the vertical slot 75 results in chips being evacuated faster from the guide insert 70, resulting in faster drilling with less need for "pecking" of the drill bit.

Certain Terminology

Terms of orientation used herein, such as "upper," "lower," "top," "bottom," "proximal," "distal," "longitudinal," "lateral," and "end," are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Summary

Several illustrative embodiments of machining jigs for a lower receiver blank have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of machining jigs for a lower receiver blank and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

What is claimed is:

1. A machining tool assembly for machining portions of a blank to form a firearm lower receiver, the blank having a top surface and a buffer tube, the machining tool assembly comprising:

a pair of side plates, the blank disposed between the pair of side plates;

a top plate coupled with the pair of side plates, the top plate including an access aperture formed therein, the access aperture being aligned with the top surface of the blank; and an adjustable alignment mechanism, the adjustable alignment mechanism being adjustably extendable from a lower surface of the top plate and adapted to contact and align the top surface of the blank with the top plate.

2. The assembly of claim 1, wherein the blank is attached to the top plate.

3. The assembly of claim 1, wherein the adjustable alignment mechanism includes a single threaded knob, the single threaded knob centered over the top surface of the blank.

4. The assembly of claim 1, wherein the adjustable alignment mechanism includes a threaded shaft and the top plate includes a tapped hole, the threaded shaft rotatably engaged within the tapped hole, a position of the adjustable alignment mechanism being adjustable by rotation of about the threaded shaft.

5. The assembly of claim 4, wherein the adjustable alignment mechanism includes a grip end coupled with the threaded shaft, the grip end including a contact surface, the contact surface being parallel with the an upper surface of the top plate and configured to engage the top surface of the blank.

6. The assembly of claim 5, wherein the grip end is wider in at least one dimension than the top surface of the blank.

7. The assembly of claim 1, wherein the adjustable alignment mechanism includes multiple adjustment points.

8. A machining tool assembly for machining portions of a blank to form a firearm lower receiver, the blank having a top surface and a buffer tube, the machining tool assembly comprising:

a pair of side plates, the blank disposed between the pair of side plates, a first side plate of the pair of side plates comprising a first set of drill apertures extending therethrough;

a top plate coupled with the pair of side plates, the top plate including an access aperture formed therein, the access aperture being aligned with the top surface of the blank; and a hand drill stabilizer coupled with one of the side plates, the hand drill stabilizer comprising a second set of drill apertures, the second set of drill apertures correspondingly aligned with the first set of drill apertures, the hand drill stabilizer configured to extend a depth of the first set of drill apertures.

9. The assembly of claim 8, wherein the hand drill stabilizer comprises one or more alignment indexes and the first side plate includes one or more corresponding alignment indexes.

10. The assembly of claim 8, wherein the hand drill stabilizer is coupled with the first side plate by a first bolt, the first bolt extending through an aperture within the hand drill stabilizer.

11. The assembly of claim 10, drill stabilizer is coupled with the first side plate by a second bolt, the second bolt extending through an aperture within the hand drill stabilizer.

12. The assembly of claim 8, wherein a depth of the second set of drill apertures is at least as great as the depth of the first set of drill apertures.

13. The assembly of claim 8, wherein the hand drill stabilizer is adapted to be reversible such that the hand drill stabilizer can be coupled with either of the first side plate and a second side plate of the pair of side plates, the second set of drill apertures configured to correspondingly align with a third set of drill apertures of the second side plate.

14. A machining tool assembly for machining portions of a blank to form a firearm lower receiver, the blank having a top surface and a buffer tube, the machining tool assembly comprising:

a pair of side plates, the blank disposed between the pair of side plates;

a top plate coupled with the pair of side plates, the top plate comprising an access aperture, the access aperture aligned with the top surface of the blank;

a guide insert aligned with the access aperture and coupled with the top plate, the guide insert comprising a pilot hole forming aperture adapted to align a drill bit with the top surface to drill a pilot hole therein;

a chip slot extending through a wall of the guide insert, the wall defining the pilot hole forming aperture, the chip slot adapted to remove chips from the pilot hole forming aperture during drilling of the top surface.

15. The assembly of claim 14, wherein the guide insert comprises a connector tab, the connector tab disposed within alignment recess of the top plate, the alignment recess and the connector tab adapted to align the pilot hole forming aperture relative to the access aperture.

16. The assembly of claim 15, wherein the guide insert comprises a trigger slot forming aperture adapted to align a mill with the top surface to mill a trigger slot therein.

17. The assembly of claim 16, wherein the chip slot extends through a second wall, the second wall defining the trigger slot forming aperture.

* * * * *

UNITED STATES PATENT AND TRADEMARK OFFICE
CERTIFICATE OF CORRECTION

PATENT NO.         : 10,391,591 B2
APPLICATION NO.    : 16/053577
DATED              : August 27, 2019
INVENTOR(S)        : Tilden Alan Smith Page 1 of 1

It is certified that error appears in the above-identified patent and that said Letters Patent is hereby corrected as shown below:

In the Claims

In Column 11 at Line 26, In Claim 5, change "with the an upper surface" to --with the upper surface--.

Signed and Sealed this
Third Day of December, 2019

Andrei Iancu
*Director of the United States Patent and Trademark Office*